United States Patent Office 3,446,640
Patented May 27, 1969

3,446,640
METHOD OF MANUFACTURE OF TRANSPARENT YELLOW AZO PIGMENT
Tatjana Ivanovna Orlova, Jugo-Zapadny raion, kvartal 38, korpus 160, Apt. 53, and Nadezhda Vasiljevna, Shcherbakova, 5 Nizhne-Likhoborsky proezd 5, Apt. 50, both of Moscow, U.S.S.R.
No Drawing. Filed June 24, 1965, Ser. No. 466,835
Int. Cl. C09d 7/12; C09b 29/00
U.S. Cl. 106—288           3 Claims

ABSTRACT OF THE DISCLOSURE

A yellow transparent monoazo pigment is produced by coupling at 18°–20° C. and a pH of 4.5–5.5, diazotized 4-chloro-2-nitroaniline with a mixture of the o-anisidide and the m-xylidide of acetoacetic acid in which the o-anisidide and m-xylidide are present in a molar ratio of 1–2.33:1 and then adding to the coupled material a sulfite liquor.

---

This invention relates to a transparent, yellow monoazo pigment of the Hansa type intended for use in three-color printing and a method for producing same.

Heretofore, transparent, yellow azo pigments, and more specifically bisazo pigments, have been manufactured by coupling bisdiazotized 3,3'-dichlorobenzidine with acetoacetarylides.

Despite the excellent properties of the benzidine pigments, the use of 3,3'-dichlorobenzidine, which is a powerful carcinogen, is objectionable.

Known in the art are methods for the manufacture of transparent, yellow monoazo pigments of the Hansa type by a coupling reaction between diazotized aromatic monoamines, and acetoacetarylides, e.g., by coupling diazotized 4-chloro-2-nitroaniline with the o-chloroanilide of acetoacetic acid, or diazotized 3-nitro-4-aminotoluene with acetoacetanilide. However, the pigments of this group suffer from the disadvantage of having an insufficiently high and stable transparency. Another disadvantage stems from the fact that the desired shades of pigments are sometimes difficult to obtain.

It is an object of the present invention to provide a process for the manufacture of a yellow monoazo pigment characterized by high and stable transparency.

Another object is to provide a process for the manufacture of a yellow monoazo pigment distinguished by high light fastness.

A further object is to provide a monoazo pigment having adequate tinctorial strength and capable of preserving the desired shade.

A still further object of the present invention is to provide a process for the manufacture of a highly transparent monoazo pigment from noncarcinogenic starting materials.

The process of the present invention provides a practical solution to the problems listed hereinabove.

It has now been found that a transparent, yellow pigment having excellent color characteristics, such as high and stable transparency, good light fastness, and adequate tinctorial strength, and likewise possessing the desired shade, can be prepared by coupling diazotized 4-chloro-2-nitroaniline (a diazo component) with a mixture of o-anisidide and m-xylidide of acetoacetic acid (a coupling component) which in the ratio of the former to the latter is 1–2.33:1; followed by treating the obtained pigment with a surface active agent, e.g., a sulfite liquor (ligno-sulfonate).

In a preferred embodiment of the present invention, the pigment is prepared by the coupling reaction of diazotized 4-chloro-2-nitroaniline and a mixture of the o-anisidide and the m-xylidide of acetoacetic acid, in which the ratio is 1.5:1, at a temperature of 18° to 20° C. and a pH of 4.5–5.5, followed by treating the obtained pigment suspension with a surface active agent at a pH of 5–5.5.

The monoazo pigment thus prepared is noted for excellent light fastness and high transparency, the hiding power of said pigment being 180 to 219 g. per m.[2].

In order to enable the invention to be more readily understood by those skilled in the art, the description is illustrated by the following examples.

Example 1

The procedure employed for preparing the diazo compound is as follows:

4-chloro-2-nitroaniline, 3.45 g. (0.02 mole), is stirred with 6.8 ml. of 28% hydrochloric acid and 4 ml. of water for 2 to 3 hours. The suspension of 4-chloro-2-nitroaniline hydrochloride obtained is diluted with 40 ml. of water, cooled to 3–4° C., and diazotized by adding 3 ml. of a 36% solution of sodium nitrite. When all of the sodium nitrite solution has been added, the diazo compound is stirred for 1 hour, and then filtered. Prior to the azo coupling reaction, excess nitrous acid is eliminated by adding sulfamic acid to the reaction mixture.

2.07 g. (0.01 mole) of the o-anisidide of acetoacetic acid and 2.05 g. (0.01 mole) of the m-xylidide of acetoacetic acid are dissolved in 2 g. of a 39.59% solution of sodium hydroxide and 70 ml. of water.

To precipitate the arylides, the alkaline solution is acidified with 1.26 g. of glacial acetic acid diluted with 8–10 ml. of water. The suspension of arylides is stirred for a short period of time, and 6 to 8 g. of crystalline sodium acetate is added thereto. Then the diazo compound solution is gradually poured into the suspension for a period of 35 minutes at a temperature of between 18 to 20° C. so as to avoid the presence of an excess of the diazo compound in the reaction mixture, the pH of the reaction mixture being maintained at 4.5 to 5.5.

When all of the diazo compound solution has been added to the coupling component, the suspension of the pigment obtained is stirred for 1 hour. Then 1.5 to 2 g. of sulfite liquor (lignosulfonate) dissolved in 120 ml. of water is added to the suspension, the pH of the solution being 5 to 5.5. The suspension is stirred for 2 to 3 hours at room temperature. The pigment obtained is filtered off, washed with demineralized neutral water and dried at a temperature of 45 to 50° C.

The procedure yields 7.6 to 7.8 g. of the dry pigment which features high transparency and shade purity.

Example 2

The diazo compound is prepared according to the procedure described in Example 1.

A mixture of 2.48 g. (0.012 mole) of the o-anisidide of acetoacetic acid and 1.64 g. (0.008 mole) of the m-xylidide of acetoacetic acid is dissolved in 2 g. of a 39.59% solution of sodium hydroxide and 70 ml. of water. To precipitate the arylides, the alkaline solution is acidified with 1.26 g. of glacial acetic acid diluted with 8–10 ml. of water. To the suspension of the arylides stirred for a short period of time, are added 6 to 8 g. of crystalline sodium acetate, the temperature of the mixture is raised to 18–20° C., and ¾ of the total volume of the diazo compound is added at once to the mixture, while the remaining solution of the diazo compound is added portionwise so as to avoid the presence of an excess of the diazo component, the pH of the reaction mixture being maintained at 4.5 to 5.5.

When all of the diazo component has been added, the suspension of the pigment obtained is stirred for 1 hour; then a solution of 2 g. of sulfite liquor (lignosulfonate)

in 120 ml. of water at pH 5–5.5 is poured into the suspension, and the mixture is further stirred for 2 to 3 hours at room temperature. The pigment is then filtered off, washed with demineralized neutral water, and dried at a temperature of 45 to 50° C.

The procedure yields about 8 g. of the dry pigment noted for shade purity and high transparency.

Example 3

The diazo compound is obtained in accordance with the procedure described in Example 1.

A mixture of 2.48 g. (0.012 mole) of the o-anisidide of acetoacetic acid and 1.64 g. (0.008 mole) of the m-xylidide of acetoacetic acid is prepared in accordance with the procedure set forth in Example 2.

Crystalline sodium acetate (6 to 8 g.) is added to the suspension of the arylides obtained. Then the solution of the diazo compound is gradually added to the suspension over a period of 25 to 30 minutes at a temperature of 18° C., the pH of the reaction mixture during azo coupling being maintained at 4.5 to 5.0.

When the coupling reaction is terminated, to the pigment suspension obtained is added a solution of 1.5 to 2 g. of sulfite liquor (lignosulfonate) in 120 ml. of water and stirred for 2 to 3 hours at room temperature.

Then the pigment is filtered off, washed with demineralized neutral water, and dried at 45 to 50° C.

The procedure yields about 8 g. of the dry pigment noted for shade purity and high transparency.

Example 4

The diazo compound is prepared according to the procedure set forth in Example 1.

The o-anisidide of acetoacetic acid (2.89 g.) and the m-xylidide of acetoacetic acid (1.23 g.) are dissolved and precipitated in accordance with the procedure described in Example 1.

To the suspension of precipitated arylides is added crystalline sodium acetate (6 to 8 g.), and then the diazo compound solution is gradually poured into it over a period of 25 of 30 minutes and at a temperature of 18 to 20° C. so as to avoid diazo component excess in the reaction mixture, which is maintained at a pH of 4.5 to 5.5.

Once the coupling reaction is completed, to the pigment suspension obtained is added a solution of 1.5 to 2 g. of sulfite liquor (lignosulfonate) dissolved in 120 ml., the pH of the mixture being maintained between 5 and 5.5. After stirring for 2 to 3 hours, at room temperature, the pigment is filtered off, washed thoroughly with demineralized neutral water, and dried at a temperature of 45 to 50° C.

The procedure yields about 8 g. of the pigment featuring pure shade and high transparency.

Example 5

The diazo compound is prepared according to the procedure described in Example 1.

The o-anisidide of acetoacetic acid (2.48 g.) and the m-xylidide of acetoacetic acid (1.64 g.) are dissolved by following the procedure disclosed in Example 1. To the alkaline solution of arylides is added 0.4 g. of a wetting agent (sodium butylnaphthyl-1-sulfonate) dissolved in 10 ml. of water.

The arylides of acetoacetic acid are precipitated in accordance with the procedure set forth in Example 1.

After some stirring, to the suspension of arylides is added crystalline sodium acetate (6 to 8 g.), and then the diazo compound solution is gradually introduced into the suspension over a period of 35 minutes at a temperature of 18 to 20° C. so as to avoid the presence of an excess of the diazo compound; the pH of the reaction mixture is maintained at 4.5 to 5.5.

Once the coupling reaction is terminated, to the pigment suspension obtained, there is added 0.6 g. of a wetting agent (sodium butylnaphthyl-1-sulfonate) dissolved in 10 ml. of water, and the mixture is stirred for 3 hours at room temperature.

The pigment is filtered off, washed thoroughly with demineralized neutral water, and dried at 45 to 50° C.

The procedure yields about 8 g. of the dry pigment noted for good shade purity and adequate transparency.

To evaluate the transparency of the pigment prepared in accordance with the procedure described in Example 2, two colors of the following composition have been prepared:

| | Parts by weight |
|---|---|
| Pigment | 10 |
| Long alkyd oil | 85 |
| Drier | 5 |

One color contains the pigment prepared in accordance with the procedure described in Example 2, while the other is prepared from the pigment synthesized by the coupling reaction between diazotized 3.3'-dichlorobenzidine and the o-anisidide of acetoacetic acid.

The mixtures are subjected to grinding in a three-roller grinding machine until the degree of fineness equals 10 microns as measured by the wedge technique.

To estimate the transparency of the pigment, use is made of a printing device to apply identical coats of the colors on a scale. The comparison of the shades shows the transparancy of the pigment prepared by the method of the present invention to be identical to that of the yellow pigment synthesized from 3,3'-dichlorobenzidine and the o-anisidide of acetoacetic acid, the index of transparency being 5 according to the 5-point scale.

The estimation of brilliance of the colors prepared by the procedure specified hereinabove is carried out by applying identical coats onto chalk overlay paper by means of a printing device.

The comparison of ultimate tints shows the brilliance of the color prepared from the pigment, specified in Example 2, to be identical to that of the color manufactured from the yellow pigment, synthesized from 3,3'-dichlorobenzidine and the o-anisidide of acetoacetic acid.

The tinctorial strength of the pigment prepared in accordance with the procedure set forth in Example 2 is determined by incorporating the pigment into a printing ink of the following composition:

| | | |
|---|---|---|
| Pigment | g. | 0.5 |
| Linseed oil | cm.$^3$ | 1.0 |
| Zinc white | g. | 5.0 |

The test printing ink contains the pigment prepared according to the procedure described in Example 1, while the reference printing ink contains the pigment synthesized from 3,3'-dichlorobenzidine and the o-anisidide of acetoacetic acid.

The colors are ground on a mechanical runner and applied by a spatula onto a 9 x 12-cm. glass plate. The comparison of smears shows the tinctorial strength of the pigment described in Example 2 to be equal to that of the pigment synthesized from 3,3'-dichlorobenzidine and the o-anisidide of acetoacetic acid.

The present invention may find various uses, in particular in the graphic arts industry for three-color printing.

The method of the present invention, therefore, makes it possible to obtain a transparent yellow azo pigment noted for high and stable transparency, extreme fastness to light, good hiding power, and desired shade.

It should be understood that although the invention has been described with reference to a preferred mode of embodiment, various changes and modifications can be resorted to without departing from the spirit and the scope of the invention as described hereinabove and in the appended claims.

We claim:

1. A method for producing a yellow, transparent monoazo pigment, said method comprising coupling at a temperature of 18°–20° C. and a pH of 4.5–5.5, diazotized 4-chloro-2-nitroaniline with a mixture of the o-anisidide and the m-xylidide of acetoacetic acid, said o-anisidide and m-xylidide being present in a molar ratio of 1–2.33:1 and adding to the thusly coupled material, at a pH of 5–5.5, a sulfite liquor containing lignosulfonate.

2. A method as claimed in claim 1 wherein the o-anisidide and the m-xylidide are present in a molar ratio of 1.5:1.

3. A yellow, transparent, monoazo pigment constituted of a mixture of compounds of the formulae:

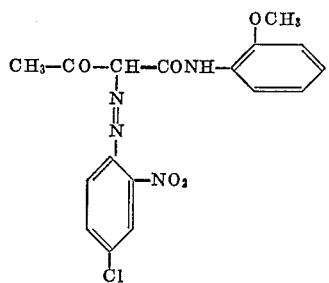

(I)

and

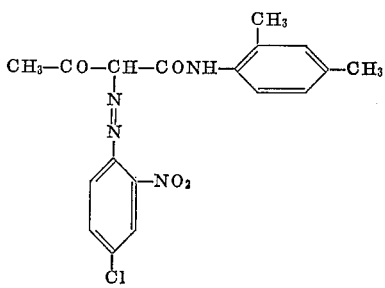

(II)

wherein the molar ratio of (I) to (II) is 1–2.33:1.

References Cited

UNITED STATES PATENTS

| | | | |
|---|---|---|---|
| 3,120,508 | 2/1964 | Braun et al. | 260—193 X |
| 3,153,564 | 10/1964 | Morgan | 260—208 X |

FOREIGN PATENTS

| | | |
|---|---|---|
| 537,070 | 6/1941 | Great Britain. |
| 685,352 | 4/1964 | Canada. |

OTHER REFERENCES

Color Index, vol. 3, second edition, 1956, p. 3023.

JAMES E. POER, *Primary Examiner.*

U.S. Cl. X.R.

106—308